UNITED STATES PATENT OFFICE.

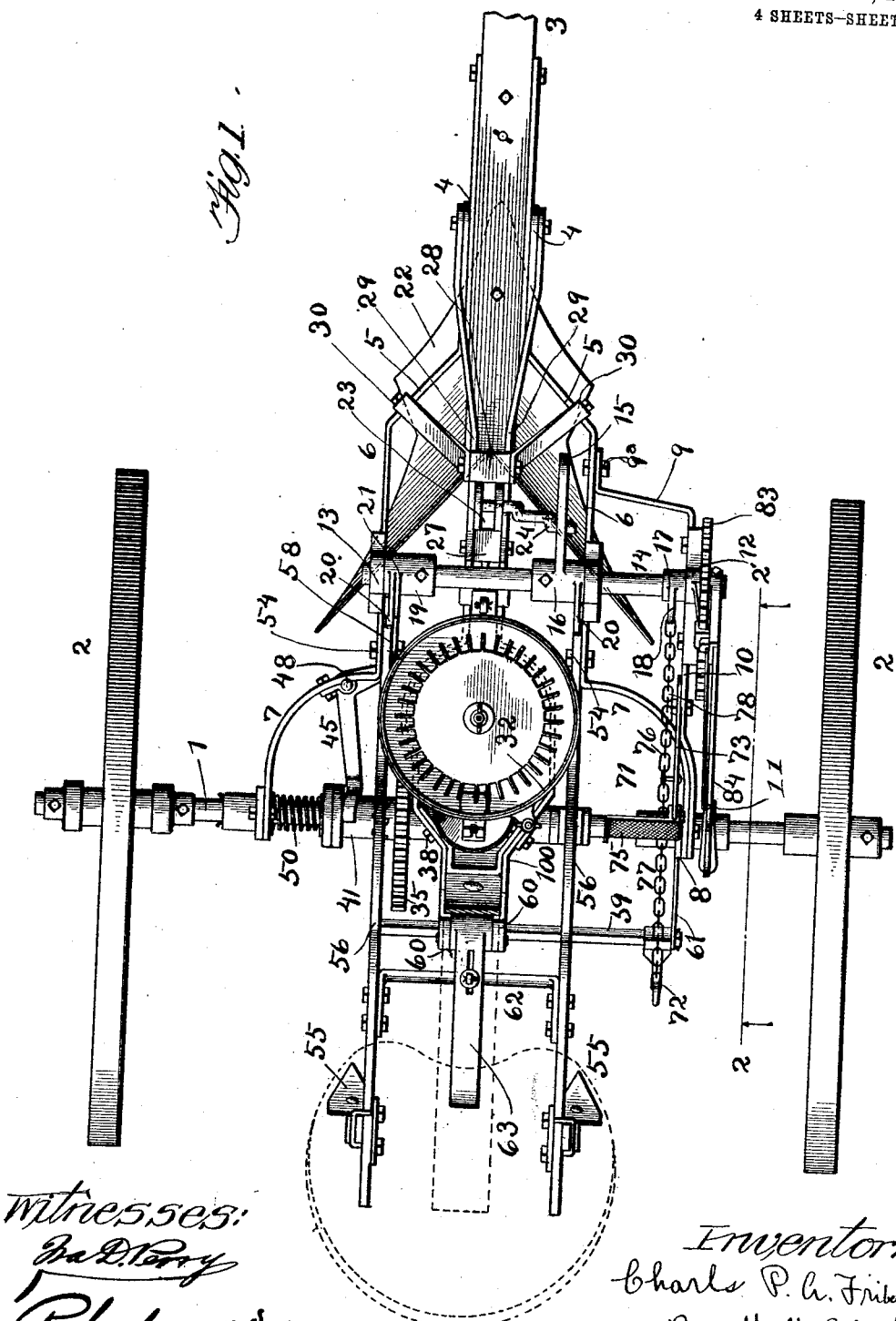

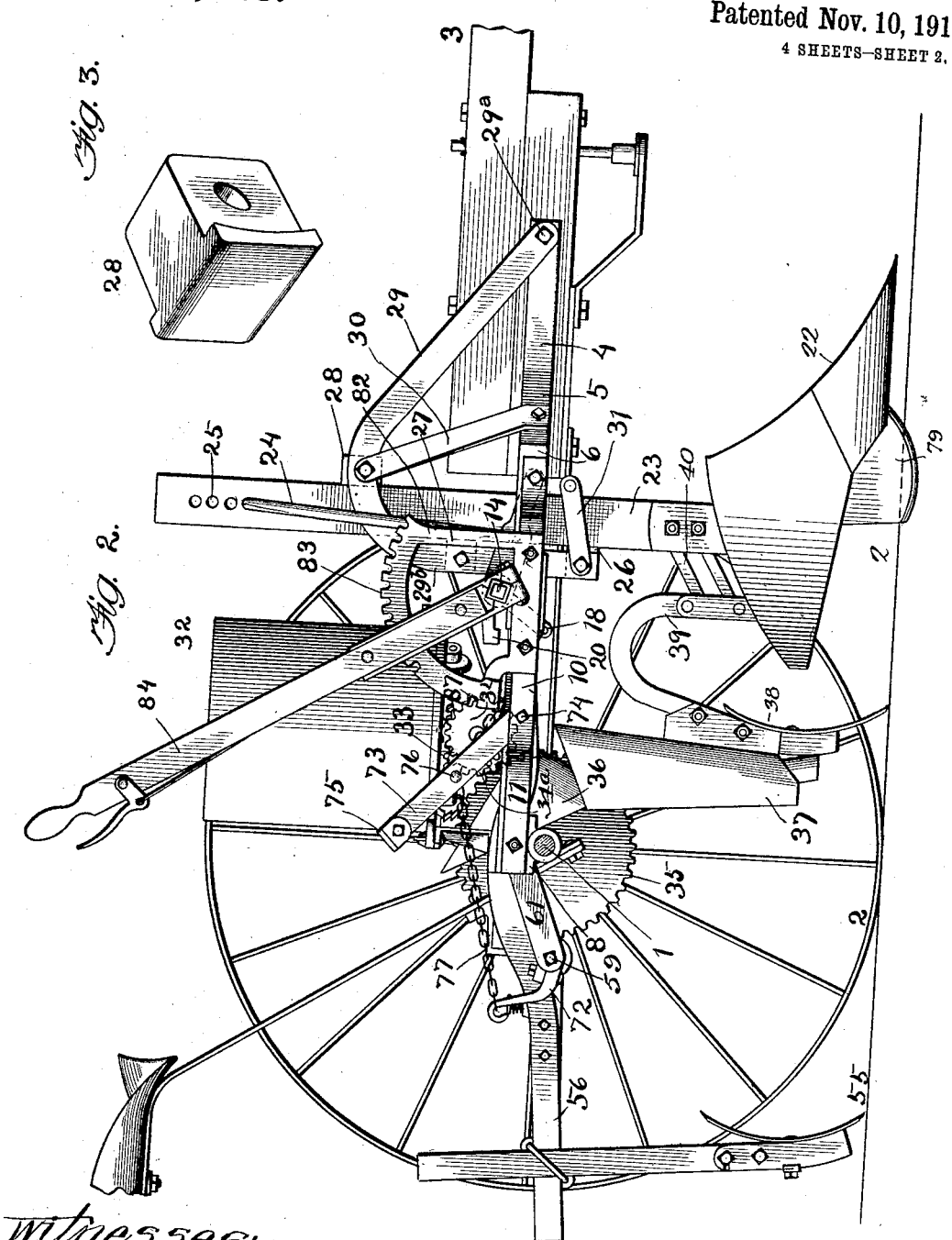

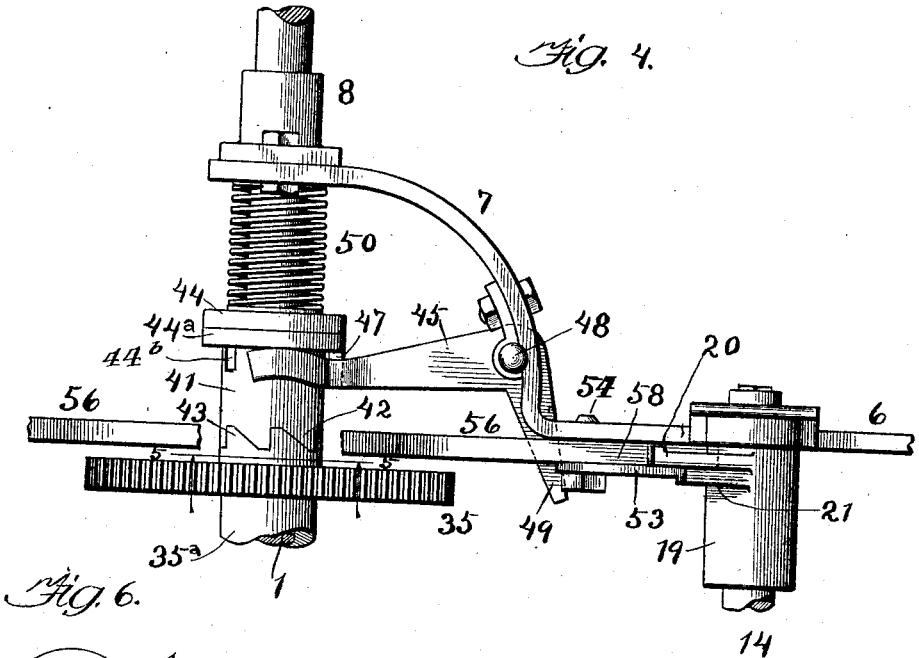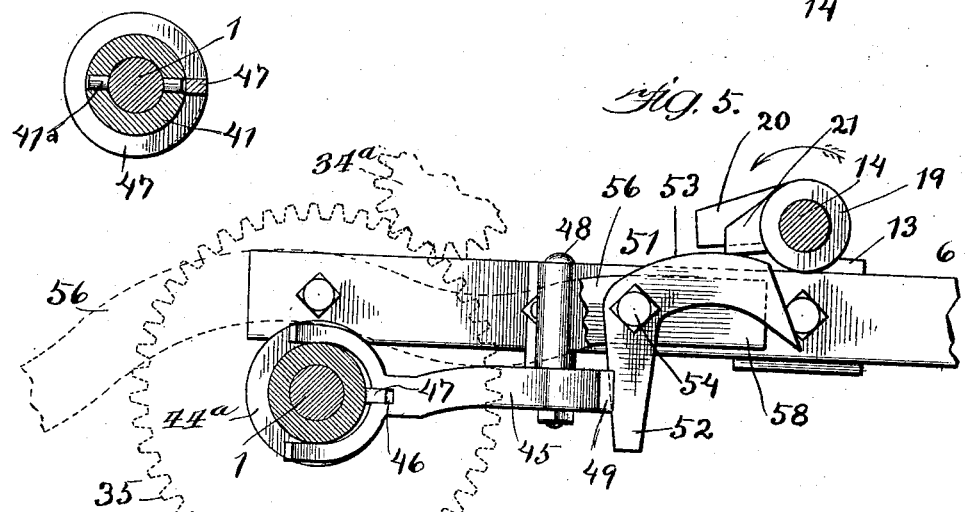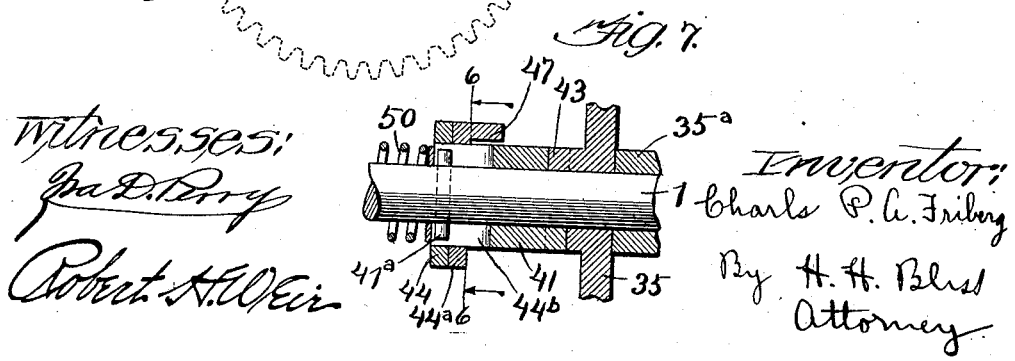

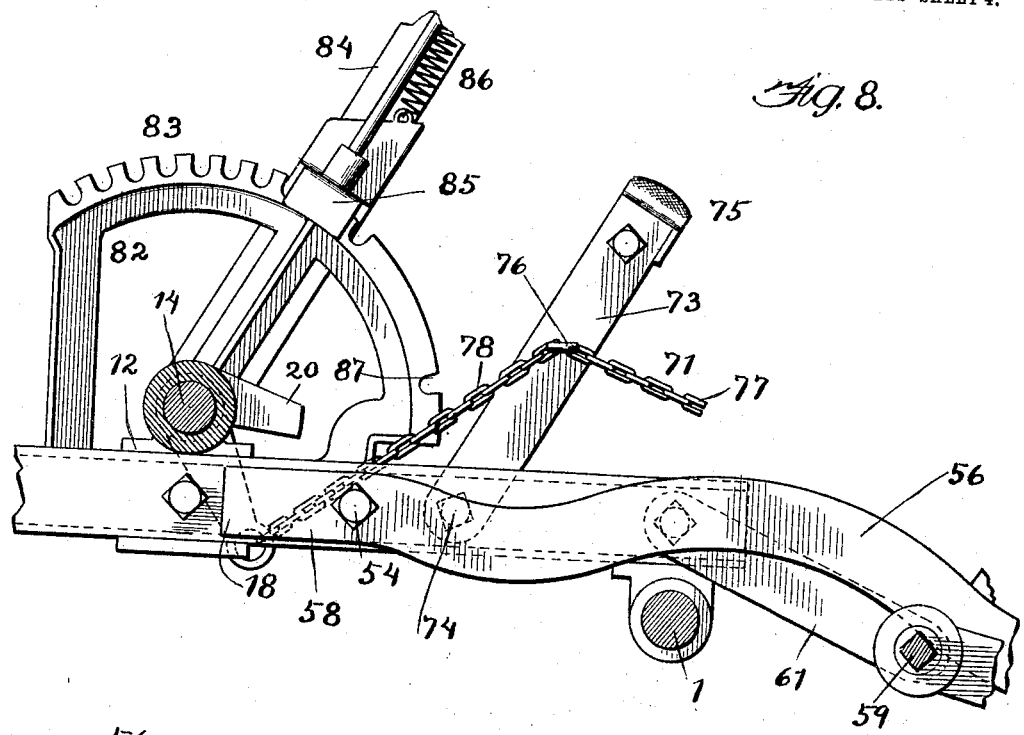
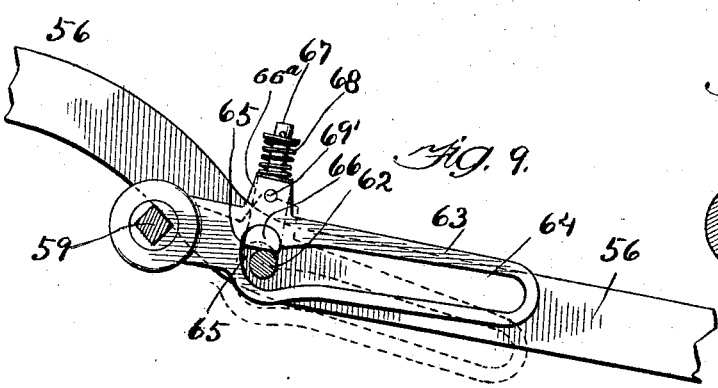
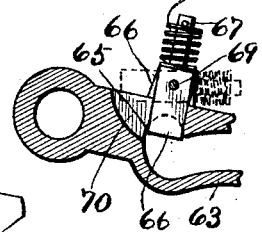
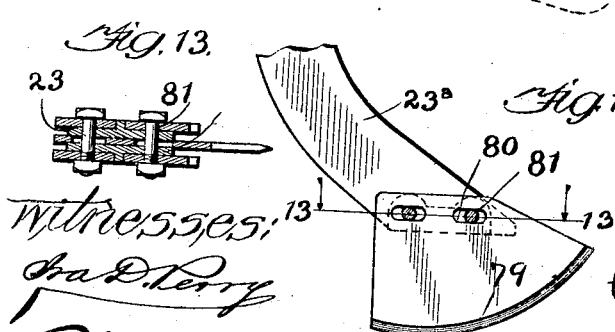
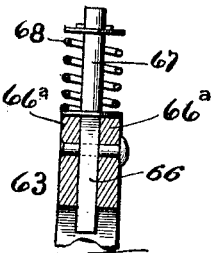

CHARLES P. A. FRIBERG, OF MOLINE, ILLINOIS, ASSIGNOR TO DEERE & MANSUR COMPANY, OF MOLINE, ILLINOIS, A CORPORATION OF ILLINOIS.

PLANTER.

1,116,813.

Specification of Letters Patent. Patented Nov. 10, 1914.

Application filed July 11, 1907. Serial No. 383,357.

*To all whom it may concern:*

Be it known that I, CHARLES P. A. FRIBERG, citizen of the United States, residing at Moline, in the county of Rock Island and State of Illinois, have invented certain new and useful Improvements in Planters, of which the following is a specification, reference being had therein to the accompanying drawings.

This invention relates to improvements in planters, pertaining more particularly to planters of the class in which each is provided with a main frame comprising a draft frame and a wheel frame rigidly connected together by intervening connecting parts, and with a scraping or plowing tool at the front followed by a furrow-opener, these in turn being followed by seed delivering devices and finally by covering devices. In machines of this class it is desirable to throw out of action, approximately simultaneously, the earth turning or opening devices and the seed delivering mechanism, and to immediately thereafter throw the covering means out of action. Heretofore in most machines of this class it has been customary to lift bodily, in relation to the wheel frame and the draft frame, all of the operative parts above referred to. That is, to elevate directly the feed hopper (with all the driving parts except the prime gear on the axle) and also the front plow, the furrow opener and the covering devices. But it has been found that there are many objections incident to structures having the parts constructed and arranged to operate in that manner, and particularly because of the bodily lifting of the seed hopper and its attached mechanism. I am aware that it has been heretofore proposed in connection with a planter of this class to provide a seeder mechanism fixedly mounted with respect to the frame and to provide a clutch whereby the power connection between the drive wheels and the seeder mechanism could be broken. But according to the proposal to which I refer it was deemed necessary to connect the clutch directly with the covering devices to be operated when the devices are lifted. Obviously this is a fatal objection, especially in a machine of the sub-type to which this invention relates in which the covering devices are not lifted until after the lifting of the plow and the furrow opener. If the plow and furrow opener is lifted before the seeder mechanism is thrown out of operation some of the seeds will be deposited on top of the ground.

One of the objects of this invention is to provide a planter having the characteristics above outlined, that is means whereby the plow and furrow opener may be lifted and the seeder mechanism simultaneously thrown out of action and whereby at a later instant the covering devices may be automatically lifted.

Another object of the invention is to provide an improved mechanism for raising and lowering the bars which carry the covering shovels.

Another object is to provide an improved means for operating the clutch which controls the transmission of power to the seeder mechanism.

A further object is to provide an improved lock mechanism for holding the shovels and the bars which carry them in working positions.

A still further object is to provide means whereby, in a planter having the features above referred to, the covering shovels may be lifted independently of the movement of the other bars.

Other objects will be apparent from the following specification and claims.

In the drawings, Figure 1 is a plan view of a planter mechanism embodying my improvements. Fig. 2 is a side elevation, one of the ground wheels being removed and the axle being shown in section on the line 2—2 of Fig. 1. Fig. 3 is a perspective of one of the abutment blocks for the plow standard. Fig. 4 is a plan view of the devices for clutching and unclutching the seed delivering mechanism. Fig. 5 is a side elevation of the parts shown in Fig. 4, the axle being shown in section on the line 5—5 of Fig. 4, and the main gear wheel being shown in dotted lines. Figs. 6 and 7 are detail sections of parts of the clutching mechanism. Fig. 8 is a side elevation of the device for mounting and holding the lifting lever, showing also some of the parts adjacent thereto. Figs. 9, 10 and 11 are details of the devices for locking and releasing the drag bars and covering shovels. Fig. 12 is a side view of the keel cutter detached. Fig. 13 is a view in section on line 13, 13 of Fig. 12.

In the drawings an axle is shown at 1, to which are connected the ground wheels 2, 2.

3 is the tongue connected to the axle by means of frame bars having the front end parts 4, the outwardly turned sections 5, the sections 6, 6 parallel to the tongue, and the outwardly extended sections 7, 7. The latter are connected to the axle by means of bracket collars or sleeves at 8.

There is a supplemental frame bar on one side of the machine shown at 9, 10 and 11. The front end of this is secured to the inner frame bar by a bolt at 9$^a$ and at its rear end 11 it is secured to the axle collar 8. Upon this part of the frame there is secured a bearing bracket or clip 12 and upon the opposite side of the machine there is a bearing bracket or clip 13 secured to the part 6 of the frame bar. In these bearings at 12, 13 there is mounted a cross rock shaft 14 to which there is secured a series of set collars 16, 17 and 19. The collar at 16 carries a forward extending crank arm 15 and a rearward extending cam arm 20. The collar 17 is formed with a crank arm 18. The collar 19 at the other end of the shaft carries a cam lug 21 and a cam arm 20; these crank arms and cams thus secured to and carried by the cross rock shaft 14 being adapted for purposes to be described.

22 indicates the primary earth implement. As shown, it is of the nature of a sweep, or center breaker plow. With the plow 22 I combine a keel cutter 79, this being carried by the standard 23 or extension parts 23$^a$. The keel is secured adjustably in position by bolts 81 passing through slots 60. The primary earth implement as a whole is supported by a vertically arranged relatively elongated standard 23. At a point near its upper end it is connected to a link 24 which extends downward and is pivotally connected to the aforesaid crank arm 15 on the shaft 14. When the shaft 14 is rocked backwardly the resulting upward thrust upon the link 24 acts to lift the standard 23 and the plow 22. The link 24 can be adjustably secured to the plow standard, there being shown a series of apertures at 25 to permit varying connections. The plow standard 23 is principally guided in its vertical movements by abutments 26, 27 and 28. These are blocks (though they may be modified in this respect) supported by carrying and bracing elements secured to and forming parts of the frame of the machine.

29 are bars secured at 29$^a$ to the tongue frame and extended upward to suitable distance, and then curved and carried downward as shown at 29$^b$. The front abutment 28 for the standard is secured between these frame bars 29.

30, 30 are braces which are connected to the bars 29 and extend outward at the bottoms to the sections 5 of the frame, where they are rigidly secured. The abutments at 26 and 27 are secured to the down-turned parts 29$^b$ of these frame bars.

31, 31 are draft bars or links situated respectively at the sides of the plow standard and secured at their front ends to the tongue frame and at their rear ends to the lower ends of the bar parts at 29$^b$.

32 represents the hopper of the seeding mechanism which can be of any suitable form as concerns the details of the seed delivering and discharging devices. The gearing is shown at 33, 34, 34$^a$ and 35. The gear wheel 35 is loosely mounted on the axle 1, being held in place longitudinally by a sleeve 35$^a$. This construction is clearly shown in Figs. 4, 5, 6 and 7. The gearing of this machine, unlike that in other mechanisms of this class with which I am acquainted remains permanently in mesh throughout the train at all times. The seed hopper maintains a fixed position in relation to the axle and the driving gearing. The seed is delivered from the hopper 32 to the chute 36, from which there extends down a tube of the usual character.

37 is a boot which surrounds and can move vertically in relation to the seed chute and tube. In front of the boot there is a furrow opener 38, this and the boot being carried by the bar 39, which is approximately U-shaped, as illustrated, and the forward leg of which is adjustably connected to the plow standard by means of the parallel link bars 40.

The seed hopper and all of the parts connected and adjacent thereto being held in fixed position relatively to the axle, as above described, I employ a mechanism differing from those heretofore used for imparting power, at will, to the seed operating device. 41 is a clutch sleeve mounted on the axle 1 having clutch teeth at 42 adapted to engage with opposing teeth 43 connected with the gear wheel 35. The sleeve 41 can slide along the axle 1 while remaining in engagement therewith, it being formed with slots at 44$^b$ in which there is seated a pin 41$^a$ inserted in the shaft. 44 is a flange on the clutch sleeve 41 and with this a shifting lever 45 engages either directly or through the bearing ring 44$^a$. This lever 45 is pivoted at 48 to the frame and has an arm 49 by which the lever can be moved to disengage or permit the engagement of the clutch teeth 42 and 43. The bearing ring 44$^a$ is provided with a lug 47 which is adapted to seat in a notch 46 in the lever 45. Lever 45 is positively moved in one direction by means of a lever 51 pivoted to the frame at 54, the short arm 52 being adapted to bear against the arm 49 of lever 45. The arm 53 of the lever lies in the path of the cam lug 21 above described carried by the rock shaft 14. When the rock shaft is rocked backward the lug 21 moves the bell lever 51 and this in turn swings the lever 45 in such a way as to open the clutch. The movement of the clutch in the opposite direction is effected by the spring 50 which surrounds the axle and bears against the stationary part of the framework in one direction and against the clutch sleeve in the opposite direction.

Behind the seed delivery mechanism there are covering shovels 55. These are carried by drag bars 56 which extend forward above and beyond the axle to the pivots at 54 where they are connected to the frame. Their front ends 58 extend somewhat forward of the pivots 54 and lie in the paths of the above-mentioned cam arms 20 carried by the rock shaft 14. When the rock shaft is rocked backward it ultimately causes the arms or lugs 20 to engage with the forward ends 58 of drag bars 56, and the rear ends of the latter are swung upward and the covering shovels are lifted.

In order to hold the drag bars 56 down when it is desired that they shall remain at work the following devices are used: 59 is a cross rock shaft mounted in bearings 60 carried by the bars 100 which extend backward from the tongue across the axle, this shaft also being held in one or more supporting bars such as shown at 61. 62 is a cross bar secured to and connecting the drag bars 56. 63 is an arm extending backward from the shaft 59, and between the bar 62 and the arm 63 are interposed the means for locking the drag bars down and the means for releasing them. The arm 63 is formed with an elongated slot 64 running longitudinally of the arm and a short end slot 65 extending transversely thereof. The cross bar 62 extends through the slotted part of the arm. 66 is a stop or lock pin pivoted at 69 in lugs 66$^a$ on the arm 63. Above this pivot 69 it has a pin extension 67 around which there is a coiled spring 68

The shaft 59 is provided with a crank arm 72, from which there extends forward a chain 71.

At 76 (see Figs. 2 and 8) this chain is secured to the lever or swinging arm 73, which is pivoted to the frame at 74, and is provided with a pedal 75, the rear section of the chain being indicated by 77 and the front section by 78, extending forward from the lever 73 to the aforesaid crank arm 18 on the cross rock shaft 14.

It will be seen that the drag bars 56 are connected to the other parts of the mechanism by two radial systems; one comprising the cross bar 62 and the sections of the drag bars extending from this cross bar 62 forward to their pivots at 54, these providing relatively long radii; the other line of connecting parts comprising the bar 62, the slotted arm 63 and the rock shaft 59. The slotted arm rocks around the axis of the shaft 59 on a radius which is much shorter than the radial distances from the bar 62 to the pivots 54 of the drag bars. It will be further seen that as long as the bar 62 and the arm 63 are so related that freedom of movement of the one relative to the other is permitted; that is to say, so long as the bar 62 can slide back and forth in the slot 64 in the arm 63, the drag bars are free to rise and fall in relation to the ground, for the difference in the lengths of the radii for the drag bars (from the cross bar 62 to their pivots 54 on the one hand, and from the cross bar 62 to the center of the rock shaft 59 on the other hand) does not impede freedom of upward swing for the bars 56. But, as will also be seen, if the cross bar 62 is prevented from moving lengthwise of the arm 63 in the slot 64, the drag bars are locked against rising upwardly because of difference in these radii. And in order to, at times, have the bar 62 free to move lengthwise in the slot 64, and at other times have it stopped against such longitudinal movement in the slot, the above-described spring actuated stop pin, or lock pin, 66 is employed, the lower part 66$^a$ of which is so shaped and arranged that it closes the short end slot 65 in the arm 63 when it (the lock pin) is in its vertical or upright position. And when it is desired to have the parts of the machine so adjusted that the drag bars and shovels can freely rise and fall, the operator throws the stop pin to its vertical position, as shown in full lines in Figs. 9 and 10. But when it is desired to prevent the drag bars from rising under any accidental lifting action, the stop pin 66 is turned down into the dotted position shown in Fig. 10, this leaving the upper part of the short end slot 65 unoccupied; and at such time, if either of the shovels commence to rise, the drag bars are lifted and the cross bar 62 rises and enters this short end part 65 of the slot in the arm 63; and at once the two radius arms (that extending from bar 62 to the pivots 54, and that extending from the bar 62 to the axis of the shaft 59) interfere with each other and the arm 63 cannot rotate, the bar 62 being thrust with a locking action against the wall at 65$^a$ of the slot 65. But, even at such times, the driver can, at will, either with his foot or his hand release the lock and permit the drag bars to rise. He can put his foot upon the pedal 75 and push forward on the lever 73, which will pull on the chain 77 and rock the shaft 59 and lift the arm 63, bringing the bottom surface wall of the slot 64 against the cross bar 62, so that the latter is free to slide longitudinally along the slot away from the short end slot 65, the differences in the radii above referred to no longer giving any effective interference. Or he can with his hand grasp the lever 84 and on drawing it backward, exert draft on the chain through the crank arm 18, which will rock the shaft 59 and release the lock as above described.

The shaft 14 is actuated by means of the lever 84.

82 is a standard secured to the frame and carrying a curved bar with ratchet teeth or notches 83.

85 is a detent or locking dog and 86 a spring normally tending to force the detent into engagement with the standard, the teeth or detent being adapted to engage with one or another of the notches at 83. When the lever is in its extreme position and the operative parts of the machine are elevated and out of action the detent engages with a notch at 87 in the standard.

The mode of operation of a mechanism having parts constructed and related as are those herein shown and described will be readily understood.

When the machine is to be set into operation, assuming that the ground engaging parts are raised and that the clutch is disengaged, the operator throws the lever 84 forward, thus rocking the shaft 14, and, by means of the arm 15 and the link 24 lowering the standard 23 with the plow 22 and the furrow opener 38. As the cam arms 20 are swung upward they permit the rear parts of the drag bars 56 to swing downward, thus lowering the shovels 55 to the ground. The cam arm 21 releases the levers 53 and 45, thus permitting the clutch to be closed under the action of the spring 50. When at any time it is desired to stop the operation of the machine, even though it is advancing bodily, as an entirety, the movement of the lever 84 backward will effect this. First, the plow standard, the plow, the furrow-opener, and the boot are raised, and at the same time the clutch is opened and the seeder stopped, and shortly thereafter the covering shovels and the drag bars are raised. It will be understood that when the chain 75 is actuated by means of the arm 18 on the shaft 14 the result is merely to release the lock for the drag bars. There is considerable lost motion at the lock and the result is that power is not transmitted through the chain to raise the bars, but, instead through the cam arms 20 which have been described.

What I claim is:

1. The combination with the axle and the frame, of the seeder mechanism mounted in fixed position with respect to the frame, the vertically movable furrow opener, the vertically movable front plow, covering shovels, the horizontally pivoted drag bars to which the shovels are connected, the movable lever for simultaneously raising the furrow opener and the front plow and throwing the seeder mechanism out of action, and means connected with the lever and operable only upon additional movement thereof to swing the drag bars upward and raise the shovels.

2. The combination of the wheel frame, the tongue or draft frame held in fixed relation to the wheel frame, the seed hopper and the seeding mechanism mounted permanently in fixed relation relatively to the draft frame and wheel frame, the means for throwing the seeder mechanism into and out of action, the front plow, the vertically sliding plow standard, the covering shovels, the drag bars therefor, the rock shaft, means actuated by the rock shaft for throwing the seeder mechanism out of action, the cam arms on the rock shaft bearing downward on the drag bars of the covering shovels to elevate the shovels, and the link connecting the rock shaft with the vertically sliding plow standard, substantially as set forth.

3. The combination of the wheel frame, the draft frame held in fixed position with relation to the wheel frame, the seed receptacle and seeding mechanism mounted permanently in fixed position with relation to the wheel frame, the clutch for throwing the seeding mechanism into and out of action, the covering shovels situated behind the axle of the wheel frame, the drag bars carrying the covering shovels and pivoted at points in front of the axle and having their ends projected forward of the pivots, the rock shaft, the means actuated by the rock shaft bearing downward upon the forward ends of the drag bars, means actuated by the rock shaft for throwing the seeder clutch out of action, the front plow, the elongated vertically sliding plow standard, and the link connecting the rock shaft with the plow standard, substantially as set forth.

4. The combination of the wheel frame, the draft frame held in fixed position with relation to the wheel frame, the seed receptacle and seeding mechanism held permanently in fixed position relatively to the draft frame, the clutch for the seeder, the covering shovels, the drag bars which carry the shovels pivoted to the frame, the stop or lock for the drag bars, the rock shaft, means for releasing the stop or lock for the drag bars, and means independent of the drag bars and actuated by the rock shaft for throwing the seeder clutch into and out of action, substantially as set forth.

5. The combination of the wheel frame, the tongue frame held in fixed position relative to the wheel frame, the seed receptacle and seeder mechanism held permanently in fixed position relatively to the wheel frame, the clutch for the seeding mechanism, the covering shovels, the drag bars which carry the covering shovels and are pivoted to the main frame, the rock shaft, the cam lug or arm on the rock shaft operating independently of the drag bars for throwing the seeder clutch into and out of action, the lock or stop for the drag bars, the second rock shaft for opening said stop or lock, and the means carried by the last said rock shaft for actuating said stop or lock, substantially as set forth.

6. The combination of the wheel frame, the tongue frame held in fixed position with relation to the wheel frame, the seed receptacle and seeding mechanism held permanently in fixed position with relation to the frame, the prime power wheel on the axle for the seeder mechanism, the clutch on the axle for engaging and disengaging said power wheel with the axle, the front plow, the vertically sliding plow standard, the covering shovels, the drag bars for the shovels pivoted to the frame, the rock shaft, means actuated by the rock shaft for lifting the drag bars and shovels, independent means actuated by the rock shaft for throwing the said clutch into and out of action, and means actuated by the rock shaft for raising and lowering the plow standard, substantially as set forth.

7. The combination of the wheel frame, the tongue mechanism, the seeding mechanism, the furrow opener, the covering shovels, drag bars for said shovels, the rear rock shaft, the chain connected to the rock shaft, means connected to the rock shaft for locking the drag bars down, and means operable as the rock shaft is turned for disengaging from each other the parts of the said locking means and for elevating the bars, substantially as set forth.

8. The combination of the axle, the wheels, the draft frame, the seeding mechanism, the furrow opening devices in front of the axle, the covering shovels, the drag bars for the shovels pivotally connected to the frame, in front of the axle, the means adjacent the front ends of the bars for raising and lowering them, the cross rock shaft behind the axle, and the arm on the shaft for supporting the drag bars and moving them vertically, substantially as set forth.

9. The combination of the axle, the wheels, the draft frame, the seed receptacle and seeding mechanism, the furrow opening devices, the covering shovels, the drag bars for the shovels pivoted to the frame, the cross bar in the rear of the axle for supporting the drag bars, and means for locking or holding down the drag bars, the said rear cross bar being adapted to actuate the locking or holding down means, substantially as set forth.

10. The combination of the axle, the wheels, the draft frame, the seed receptacle, the seeding mechanism, the furrow opening devices, the covering shovels, the drag bars for the shovels pivoted at their front ends to the frame, the slotted arm 63, the stop or lock for the drag bars carried by said arm, and the cross rock shaft behind the axle adapted to stop the drag bars and adapted to release the lock which holds the drag bars, substantially as set forth.

11. The combination of the axle, the wheels, the draft frame, the seeder mechanism, the furrow opener, the covering shovels, the drag bars for the shovels pivoted to the frame at their front ends, the bar connecting the drag bars, the rock shaft behind the axle, means for actuating the rock shaft, the slotted arm carried by the rock shaft and having in the slot the cross bar which connects the drag bars, means carried by the slotted arm for holding said cross arm down, and means associated with the rock shaft and adapted to release the holding means, substantially as set forth.

12. In a planting mechanism of the class described the combination of the wheel frame, the draft frame held in fixed position in relation to the wheel frame, the seeding mechanism, the vertically adjustable front plow, the adjustable front standard, the drag bars, the covering shovels carried by the drag bars, the rock shaft situated above the drag bars and having the downwardly acting cam lugs 20 for the drag bars, the crank arm 15 for actuating the plow standard, and the cam lug 21 for throwing the seeder into and out of action, substantially as set forth.

13. In a planter of the class described, the combination of the wheel frame, the draft frame, the seeder mechanism, the clutch for the seeder, the rock shaft, means actuated by the rock shaft for vertically adjusting the plow and standard, means actuated by the rock shaft for elevating the drag bars and shovels, the clutch lever 45, and means actuated by the rock shaft for moving the last said lever, substantially as set forth.

14. The combination of the wheel frame, the tongue frame held in fixed position with relation to the wheel frame, the seed receptacle and seeding mechanism held permanently in fixed position with relation to the frame, the clutch for the said mechanism, the front plow, the vertically sliding plow standard, the covering shovels, the drag bars for the shovels pivoted to the frame, the rock shaft, means actuated by the rock shaft for lifting the drag bars and shovels, independent means actuated by the rock shaft for throwing the said clutch into and out of action, and means actuated by the rock shaft for raising and lowering the plow standard, substantially as set forth.

15. The combination of the axle, the wheels, the draft frame, the seeder mechanism, the furrow opener, the covering shovels, the drag bars carrying the shovels and pivoted to the frame, a stop or lock for the drag bars, a rock shaft adapted to release the stop or lock and to lift the drag bars, a lever for said rock shaft, and a supplementary lever for releasing the said stop or lock independently of the rock shaft.

16. The combination of the wheel frame, the draft frame, the seeder mechanism, the furrow opener, the covering shovels, the drag bars carrying the shovels and pivoted to the frame, a stop or lock for the drag bars, and a lever adapted when moved to a certain point to release the lock permitting the drag bars to float and when moved beyond said point to lift the drag bars without moving the said furrow opener or affecting the said seeder mechanism.

17. The combination of the wheel frame, the tongue frame, the seeder mechanism, the furrow opener, the covering shovels, the drag bars carrying the shovels and pivoted to the frame, a lever adapted to raise and lower the furrow opener and the drag bars and to throw into and out of operation the seeder mechanism, and a second lever for raising and lowering the drag bars alone.

18. The combination of the wheel frame, the tongue frame, the seeder mechanism, the furrow opener, the covering shovels, the drag bars carrying the shovels and pivoted to the frame, a stop or lock for the drag bars, a lever for throwing into and out of operation the seeder mechanism, for raising and lowering the furrow opener, for raising and lowering the drag bars and for moving into and out of operative position the lock for the drag bars, and a second lever also adapted to move into and out of operative position the said lock.

19. The combination of the wheel frame, the tongue frame, the seeder mechanism, the furrow opener, the covering shovels, the drag bars carrying the shovels and pivoted to the frame, a stop or lock for the drag bars, a lever for throwing into and out of operation the seeder mechanism for raising and lowering the furrow opener, for raising and lowering the drag bars and for operating the lock for the drag bars, and a second lever also adapted to operate the said lock and to raise and lower the said drag bars independently of the furrow opener and the seeder mechanism.

In testimony whereof I affix my signature, in presence of two witnesses.

CHARLES P. A. FRIBERG.

Witnesses:
CHARLES H. POPE,
CHARLES E. WHITE.

Correction in Letters Patent No. 1,116,813.

It is hereby certified that the name of the patentee in Letters Patent No. 1,116,813, granted November 10, 1914, for an improvement in "Planters", was erroneously printed as "Charles P. A. Friberg," whereas said name should have been printed *Charls P. A. Friberg;* and that the said Letters Patent should be read with this correction therein that the same may conform to the record of the case in the Patent Office.

Signed and sealed this 24th day of November, A. D., 1914.

[SEAL.]
R. F. WHITEHEAD.
*Acting Commissioner of Patents.*